US012666506B2

(12) United States Patent
Hosokawa et al.

(10) Patent No.: US 12,666,506 B2
(45) Date of Patent: Jun. 23, 2026

(54) MICROWAVE TREATMENT DEVICE

(71) Applicant: Panasonic Intellectual Property Management Co., Ltd., Osaka (JP)

(72) Inventors: Daisuke Hosokawa, Shiga (JP); Chikako Hosokawa, Shiga (JP); Yoshiharu Oomori, Shiga (JP); Hideki Nakamura, Kyoto (JP); Kazuki Maeda, Shiga (JP); Takashi Uno, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 976 days.

(21) Appl. No.: 17/758,968

(22) PCT Filed: Jan. 26, 2021

(86) PCT No.: PCT/JP2021/002532
§ 371 (c)(1),
(2) Date: Feb. 6, 2023

(87) PCT Pub. No.: WO2021/166563
PCT Pub. Date: Aug. 26, 2021

(65) Prior Publication Data

US 2023/0199923 A1 Jun. 22, 2023

(30) Foreign Application Priority Data

Feb. 21, 2020 (JP) ................................ 2020-027701

(51) Int. Cl.
*H05B 6/68* (2006.01)
*H05B 6/64* (2006.01)

(52) U.S. Cl.
CPC .......... *H05B 6/686* (2013.01); *H05B 6/6447* (2013.01)

(58) Field of Classification Search
CPC ....... H05B 6/6447; H05B 6/686; H05B 6/705
(Continued)

(56) References Cited

U.S. PATENT DOCUMENTS 6,080,270 A * 6/2000 Tabrez .................. H05B 6/701 156/345.36
2010/0006564 A1 1/2010 Ben-Shmuel et al.
(Continued)

FOREIGN PATENT DOCUMENTS

| | | |
|---|---|---|
| CN | 103797895 | 5/2014 |
| JP | 2009-527883 | 7/2009 |
| WO | 2013/038715 | 3/2013 |

OTHER PUBLICATIONS

English Translation of Chinese Search Report issued Jul. 29, 2024 in corresponding Chinese Patent Application No. 202180014986.6.
(Continued)

*Primary Examiner* — Quang T Van
(74) *Attorney, Agent, or Firm* — Wenderoth, Lind & Ponack, L.L.P.

(57) ABSTRACT

A microwave treatment device according to one aspect of the present disclosure includes a heating chamber, a microwave generator, an amplifier, a feeder, a detector, a controller, and a storage. The microwave generator generates a microwave having an arbitrary frequency in a predetermined frequency band. The amplifier amplifies the microwave and outputs the amplified microwave as incident microwave power. The feeder supplies the incident microwave power to the heating chamber. The detector detects the incident microwave power and reflected microwave power that returns from the heating chamber to the feeder. The storage stores the incident microwave power and the reflected microwave power in association with the frequency of the microwave and time elapsed since the start of heating. The
(Continued)

controller causes the microwave generator to execute a frequency sweep over the predetermined frequency band.

15 Claims, 10 Drawing Sheets

(58) Field of Classification Search
USPC ....... 219/709, 702, 703, 704, 739, 746, 748, 219/750, 754, 757, 678
See application file for complete search history.

(56) References Cited

U.S. PATENT DOCUMENTS

| | | | |
|---|---|---|---|
| 2010/0006565 | A1 | 1/2010 | Ben-Shmuel et al. |
| 2011/0017728 | A1 | 1/2011 | Ben-Shmuel et al. |
| 2012/0125921 | A1 | 5/2012 | Shim et al. |
| 2013/0087545 | A1 | 4/2013 | Bilchinsky et al. |
| 2013/0168388 | A1 | 7/2013 | Moon et al. |
| 2015/0041458 | A1 | 2/2015 | Muto et al. |
| 2019/0335550 | A1 | 10/2019 | Ben-Shmuel et al. |
| 2020/0253005 | A1 | 8/2020 | Libman et al. |

OTHER PUBLICATIONS

Extended European Search Report dated Jul. 12, 2023 in related European Patent Application No. 21756754.4.
International Search Report of PCT application No. PCT/JP2021/002532 dated Apr. 6, 2021.

* cited by examiner

MICROWAVE TREATMENT DEVICE

TECHNICAL FIELD

The present disclosure relates to microwave treatment devices including microwave generators.

DESCRIPTION OF THE RELATED ART

A conventionally known microwave treatment device includes a semiconductor oscillation element and is configured to control the frequency and the output level of a microwave to heat a heating target more evenly (for example, refer to Patent Literature (PTL) 1).

The conventional microwave treatment device calculates, on the basis of the difference between an incident microwave and a reflected microwave, the amount of microwave power absorbed by a heating target at each frequency. On the basis of this information, the conventional microwave treatment device adjusts the output level and the oscillation time of the microwave at each frequency to make heating even.

A change in the frequency of the microwave causes a change in the distribution of the microwaves in a heating chamber, that is, a heating pattern for a heating target. Therefore, in the conventional microwave treatment device, it is considered important to make an adjustment such that a heating target absorbs substantially the same electric power at each frequency.

The conventional microwave treatment device assumes the difference between the incident microwave and the reflected microwave as the amount of electric power absorbed by a heating target, and controls the frequency, the output level, and the oscillation time of the microwave so that the heating target absorbs substantially the same electric power at each frequency.

In the conventional technique, dissipation of microwaves in a microwave transmission path and on a wall surface of a heating chamber is taken into consideration. This improves the accuracy in estimating the electric power absorbed by a heating target at each frequency.

CITATION LIST

Patent Literature

PTL 1: Unexamined Japanese Patent Publication (Translation of PCT Publication) No. 2009-527883

SUMMARY

However, even when the technique disclosed in PTL 1 is applied to a microwave oven, it is difficult to make heating sufficiently even in actual cooking.

When the microwave oven heats food, the permittivity of the food changes with a change in temperature. Particularly, in the case of a frozen food, when a portion of the frozen food is defrosted due to an increase in temperature, the permittivity of the defrosted portion increases sharply. Therefore, even when the frequency and the output level of the microwaves are controlled, it is difficult to keep the microwaves from converging to the defrosted portion of the frozen food. As a result, heating becomes uneven.

In the heating chamber of a microwave oven, microwaves have a strong tendency to converge to a portion of a heating target that is close to a feeder than the other portions. Therefore, even when the frequency and the output level of the microwaves are controlled, it is difficult to keep the microwaves from converging to the defrosted portion of the frozen food. As a result, heating becomes uneven.

An object of the present disclosure is to provide a microwave treatment device capable of heating a heating target more evenly.

A microwave treatment device according to one aspect of the present disclosure includes: a heating chamber configured to accommodate a heating target; a microwave generator; an amplifier; a feeder; a detector; a controller; and a storage.

The microwave generator generates a microwave having an arbitrary frequency in a predetermined frequency band. The amplifier amplifies the microwave and outputs the amplified microwave as incident microwave power. The feeder supplies the incident microwave power to the heating chamber. The detector detects the incident microwave power and reflected microwave power that returns from the heating chamber to the feeder. The storage stores the incident microwave power and the reflected microwave power in association with the frequency of the microwave and time elapsed since the start of heating.

The controller causes the microwave generator to execute a frequency sweep over the predetermined frequency band. The controller controls the microwave generator and the amplifier based on the incident microwave power and the reflected microwave power detected during the frequency sweep.

According to the present aspect, the heating evenness can be improved.

DETAILED DESCRIPTIONS

Figure 1:
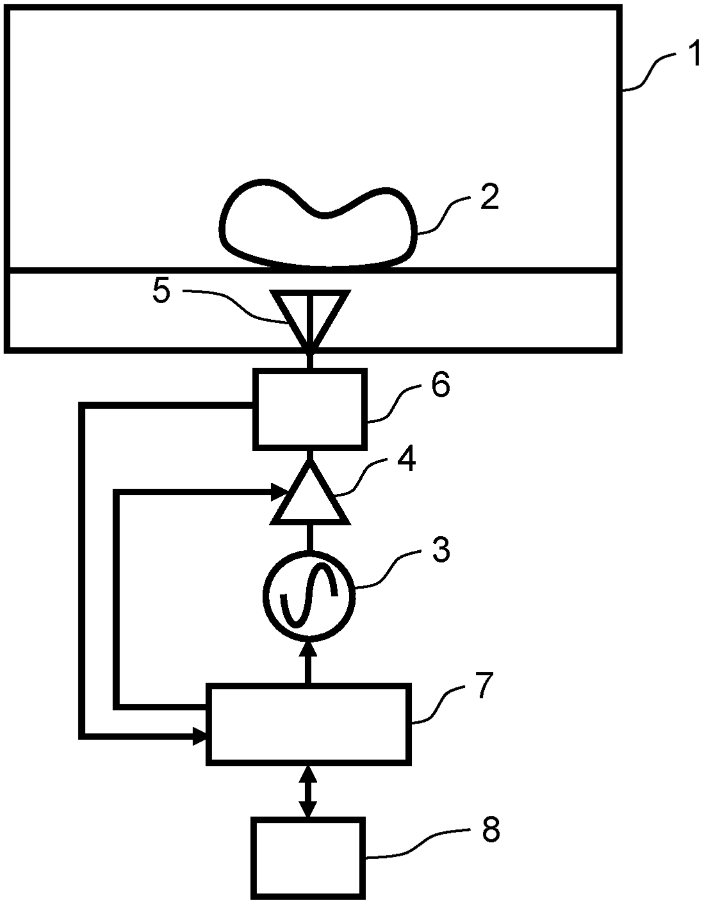
FIG. 1 is a schematic configuration diagram showing one example of a microwave treatment device according to an exemplary embodiment of the present disclosure.

Underlying Knowledge Forming Basis of Present Disclosure

In the above-described conventional technique, the frequency, the output level, and the oscillation time of microwaves are controlled using, as an index, the electric power absorbed by a heating target. However, the conventional technique is limited in terms of advantageous effects regarding the heating evenness and does not significantly reduce the occurrence of microwaves converging to a local point.

If specific limitations are imposed on the kind, shape, size, and placement of a heating target, certain advantageous effects may be produced regarding the heating evenness. However, it is difficult to apply the conventional technique to actual cooking in a microwave oven.

In order to heat a heating target more evenly, it is important to find out how to reduce a difference in the internal temperature of food that is being heated. The inventors conceived of the following invention. The present invention is to control the frequency, the output level, and the oscillation time of microwaves on the basis of heat conduction of a heating target and heat radiation from a surface of the heating target. With this, a local increase in temperature and a local change in permittivity are reduced, and as a result, a heating target can be heated more evenly.

A microwave treatment device according to the first aspect of the present disclosure includes: a heating chamber configured to accommodate a heating target; a microwave generator; an amplifier; a feeder; a detector; a controller; and a storage.

The microwave generator generates a microwave having an arbitrary frequency in a predetermined frequency band. The amplifier amplifies the microwave and outputs the amplified microwave as incident microwave power. The feeder supplies the incident microwave power to the heating chamber. The detector detects the incident microwave power and reflected microwave power that returns from the heating chamber to the feeder. The storage stores the incident microwave power and the reflected microwave power in association with the frequency of the microwave and time elapsed since the start of heating.

The controller causes the microwave generator to execute a frequency sweep over the predetermined frequency band. The controller controls the microwave generator and the amplifier on the basis of the incident and reflected microwave power detected during the frequency sweep.

In a microwave treatment device according to the second aspect of the present disclosure, which is based on the first aspect, the controller sets, in changing the frequency of the microwave, non-operating time during which the microwave is not output. The controller changes the non-operating time according to the frequency of the microwave.

In a microwave treatment device according to the third aspect of the present disclosure, which is based on the second aspect, the controller calculates a reflected wave ratio which is a ratio of the reflected microwave power to the incident microwave power at each frequency applied in the frequency sweep. The controller sets the non-operating time longer as the reflected wave ratio decreases.

In a microwave treatment device according to the fourth aspect of the present disclosure, which is based on the second aspect, the controller calculates a reflected wave ratio which is a ratio of the reflected microwave power to the incident microwave power at each frequency applied in the frequency sweep. The controller avoids setting the non-operating time for the microwave having the frequency at which the reflected wave ratio exceeds a predetermined value.

In a microwave treatment device according to the fifth aspect of the present disclosure, which is based on the second aspect, the controller changes a duty ratio in output of the microwave according to the frequency.

In a microwave treatment device according to the sixth aspect of the present disclosure, which is based on the fifth aspect, the controller calculates a reflected wave ratio which is a ratio of the reflected microwave power to the incident microwave power at each frequency applied in the frequency sweep. The controller sets the duty ratio higher as the reflected wave ratio increases.

In a microwave treatment device according to the seventh aspect of the present disclosure, which is based on the fifth aspect, the controller calculates a reflected wave ratio which is a ratio of the reflected microwave power to the incident microwave power at each frequency applied in the frequency sweep. The controller sets, to 100 percent, the duty ratio of the microwave having the frequency at which the reflected wave ratio exceeds a predetermined value.

In a microwave treatment device according to the eighth aspect of the present disclosure, which is based on the first aspect, the controller causes the microwave generator to alternately generate the microwave having the frequency at which a reflected wave ratio which is a ratio of the reflected microwave power to the incident microwave power is relatively high and the microwave having the frequency at which the reflected wave ratio is relatively low In a microwave treatment device according to the ninth aspect of the present disclosure, which is based on the eighth aspect, the controller causes the microwave generator to generate the microwave in descending order of the frequency when the reflected wave ratio at the frequency is relatively high. The controller causes the microwave generator to generate the microwave in ascending order of the frequency when the reflected wave ratio at the frequency is relatively low.

In a microwave treatment device according to the tenth aspect of the present disclosure, which is based on the first aspect, the controller calculates a reflected wave ratio which is a ratio of the reflected microwave power to the incident microwave power at each frequency applied in the frequency sweep. The controller causes the microwave generator to generate the microwave in descending order of the reflected wave ratio starting from the microwave having a frequency at which the reflected wave ratio is highest.

In a microwave treatment device according to the eleventh aspect of the present disclosure, which is based on the first aspect, the controller calculates a reflected wave ratio which is a ratio of the reflected microwave power to the incident microwave power at each frequency applied in the frequency sweep. The controller causes the microwave generator to generate only the microwave having the frequency at which the reflected wave ratio exceeds a predetermined value.

In a microwave treatment device according to the twelfth aspect of the present disclosure, which is based on the eleventh aspect, the controller causes the microwave generator to generate, during a period between the start and an end of the heating, only the microwave having the frequency at which the reflected wave ratio exceeds the predetermined value.

In a microwave treatment device according to the thirteenth aspect of the present disclosure, which is based on the eleventh aspect, the controller calculates the reflected wave ratio until a first half of the period between the start and the end of the heating elapses.

In a microwave treatment device according to the fourteenth aspect of the present disclosure, which is based on any one of the first to thirteenth aspects, on the basis of a temperature within the heating chamber, the controller causes the microwave generator to execute the frequency sweep, and resets the frequency and an output level of the microwave which are oscillation conditions for the microwave.

In a microwave treatment device according to the fifteenth aspect of the present disclosure, which is based on the fourteenth aspect, each time the temperature within the heating chamber changes by a predetermined value, the controller causes the microwave generator to execute the frequency sweep, and resets the oscillation conditions for the microwave.

In a microwave treatment device according to the sixteenth aspect of the present disclosure, which is based on the fourteenth aspect, each time the temperature in the heating chamber passes a predetermined temperature, the controller causes the microwave generator to execute the frequency sweep, and resets the oscillation conditions for the microwave.

This configuration allows a reduction in the impact of a change in the resonance frequency within the heating chamber that is due to a change in the temperature within the heating chamber, and by determining the timing of resetting on a specific condition, allows heating to be stably carried out more evenly.

Hereinafter, an exemplary embodiment of the present disclosure will be described with reference to the accompanying drawings.

FIG. 1 is a schematic configuration diagram showing one example of a microwave treatment device according to an exemplary embodiment of the present disclosure. As shown in FIG. 1, the microwave treatment device according to the present exemplary embodiment includes heating chamber 1, microwave generator 3, amplifier 4, feeder 5, detector 6, controller 7, and storage 8.

Heating chamber 1 accommodates heating target 2 such as food, which is a load. Microwave generator 3 includes a semiconductor element. Microwave generator 3, which can generate a microwave having an arbitrary frequency in a predetermined frequency band, generates a microwave having a frequency designated by controller 7.

Amplifier 4 includes a semiconductor element. Amplifier 4 amplifies, according to an instruction from controller 7, the microwave generated by microwave generator 3, and outputs the amplified microwave.

Feeder 5, which functions as an antenna, supplies the microwave amplified by amplifier 4 to heating chamber 1 as incident microwave power. In other words, feeder 5 supplies, to heating chamber 1, the incident microwave power based on the microwave generated by microwave generator 3. In the incident microwave power, electric power that has not been consumed by heating target 2 or the like returns from heating chamber 1 to feeder 5 as reflected microwave power.

Detector 6 includes a directional coupler, for example. Detector 6 measures the amounts of the incident microwave power and the reflected microwave power and notifies controller 7 of this information. In other words, detector 6 functions as both an incident-microwave-power detector and a reflected-microwave-power detector.

Detector 6, which has a coupling of approximately −40 dB, for example, extracts electric power that is approximately 1/10000 of the incident microwave power and the reflected microwave power. The extracted incident microwave power and the extracted reflected microwave power are rectified at a detector diode (not shown in the drawings), smoothed at a capacitor (not shown in the drawings), and then converted into information corresponding to the incident microwave power and the reflected microwave power. Controller 7 receives the information.

Storage 8, which includes semiconductor memory or the like, stores data obtained from controller 7, reads the stored data, and transmits the read data to controller 7. In particular, storage 8 stores, together with the frequency of the microwave and time elapsed since the start of heating, the amounts of the incident microwave power and the reflected microwave power measured by detector 6.

Controller 7 includes a microprocessor including a central processing unit (CPU). On the basis of the information from detector 6 and storage 8, controller 7 controls microwave generator 3 and amplifier 4 to perform cooking control of the microwave treatment device.

Controller 7 causes microwave generator 3 to execute a frequency sweep. The frequency sweep is an operation performed by microwave generator 3 to sequentially change the frequency at predetermined frequency intervals over a predetermined frequency band. In the present exemplary embodiment, the predetermined frequency band is 2,400 MHz to 2,500 MHz.

After the frequency sweep, controller 7 selects, from the predetermined frequency band, a frequency to be used to heat heating target 2. Specifically, on the basis of the values of the incident microwave power and the reflected microwave power detected during the frequency sweep, controller 7 calculates a reflected wave ratio which is the ratio (%) of the reflected microwave power to the incident microwave power. On the basis of the reflected wave ratio, controller 7 controls the oscillating frequency of the microwave at microwave generator 3 and the amplification factor of the microwave at amplifier 4 to supply the microwave having a frequency for heating to heating chamber 1.

The inner wall of heating chamber 1 repeatedly reflects the microwave supplied to heating chamber 1. A heating pattern for heating target 2 in heating chamber 1 depends on interference between the microwaves that occurs at this time.

The wavelength of the microwave changes according to the frequency. A change in the wavelength of the microwave causes changes in the areas that are strongly and lightly heated by the microwave. Therefore, the interference between the microwaves that are repeatedly reflected changes, and the heating pattern also changes accordingly.

This means that when the frequency and the output level of the microwaves are properly controlled, heating target 2 can be heated more evenly.

Hereinafter, various control methods using controller 7 according to the present exemplary embodiment will be described as Examples 1 to 11. At least two of the following examples may be arbitrarily combined as long as those do not contradict each other.

EXAMPLE 1

Figure 2A:
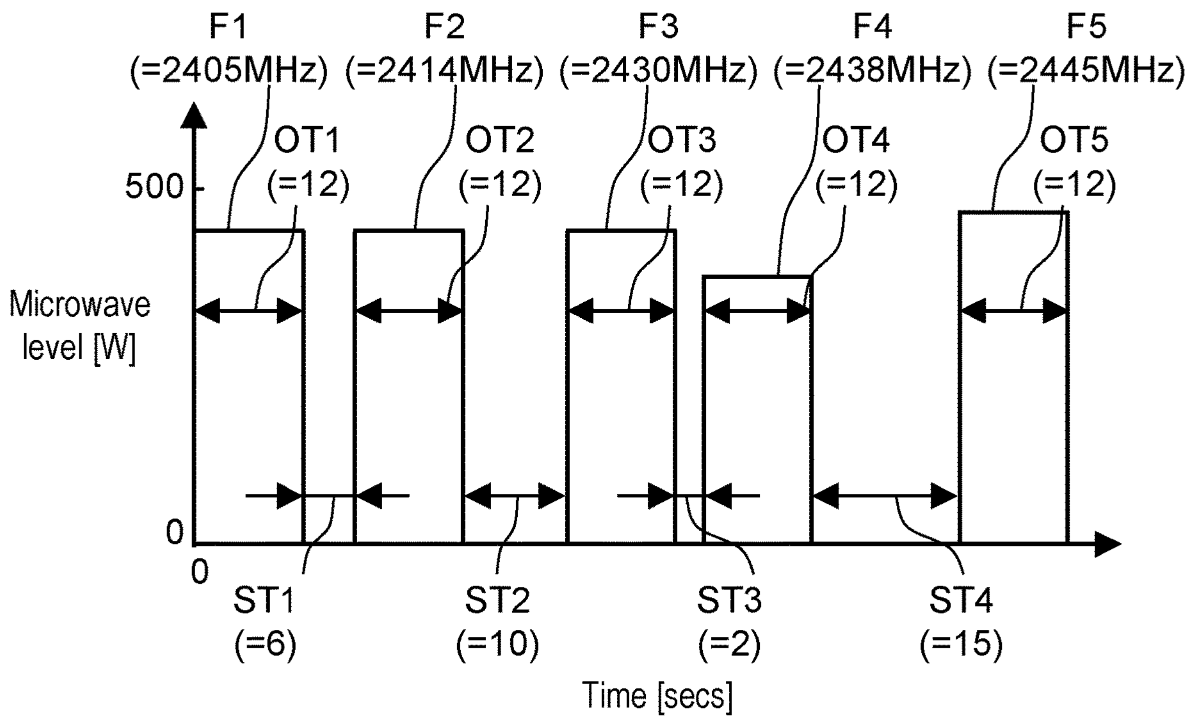
FIG. 2A is a diagram schematically showing one example of temporal changes in a frequency, an output level, and non-operating time according to Example 1.
Figure 2B:
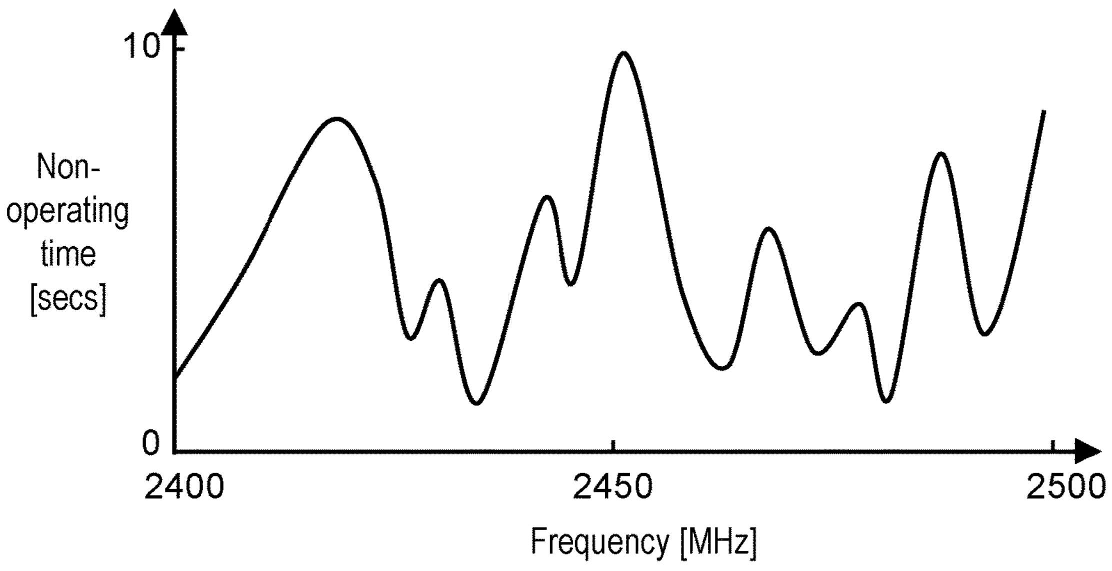
FIG. 2B is a diagram showing one example of non-operating time that is set for each frequency according to Example 1.

Example 1 of the present exemplary embodiment will be described. FIG. 2A is a diagram schematically showing one example of temporal changes in the frequency, the output level, and the non-operating time of the microwave according to Example 1. FIG. 2B is a diagram showing one example of the non-operating time that is set for each frequency of the microwave according to Example 1.

As shown in FIG. 2A, in Example 1, at the time of switching the frequency of the microwave, controller 7 causes microwave generator 3 to stop outputting the microwave. In the present exemplary embodiment, a period during which microwave generator 3 outputs microwaves is referred to as output time, and a period during which microwave generator 3 avoids outputting microwaves is referred to as non-operating time.

Specifically, for example, as shown in FIG. 2A, all of output time OT1 to output time OT5 is 12 seconds. Non-operating time ST1 is six seconds, non-operating time ST2 is 10 seconds, non-operating time ST3 is two seconds, and non-operating time ST4 is 15 seconds. Frequency F1 is 2,405 MHz, frequency F2 is 2,414 MHz, frequency F3 is 2,430 MHz, frequency F4 is 2,438 MHz, and frequency F5 is 2,445 MHz.

With this method, heat transfers into heating target 2 and radiates from a surface of heating target 2 during the non-operating time. Therefore, it is possible to reduce heating unevenness caused due to the heating pattern with microwaves at the immediate previous frequency.

In this manner, it is possible to reduce variations in the permittivity of heating target 2 that have been caused due to the heating unevenness before microwaves are supplied at the next frequency. As a result, the microwaves can be kept from converging to a portion of heating target 2 that has increased permittivity, allowing for improved heating evenness.

The heating pattern and the heating unevenness change depending on the frequency. The non-operating time for reducing the heating unevenness differs at each frequency.

As shown in FIG. 2B, the non-operating time is changed according to the frequency of the microwave, and thus the heating evenness can be improved. In Example 1, when the required minimum non-operating time is set, cooking time can be kept from becoming longer than necessary. The non-operating time may be replaced by low-output time during which the output level of the microwaves is significantly reduced.

EXAMPLE 2

Figure 3:
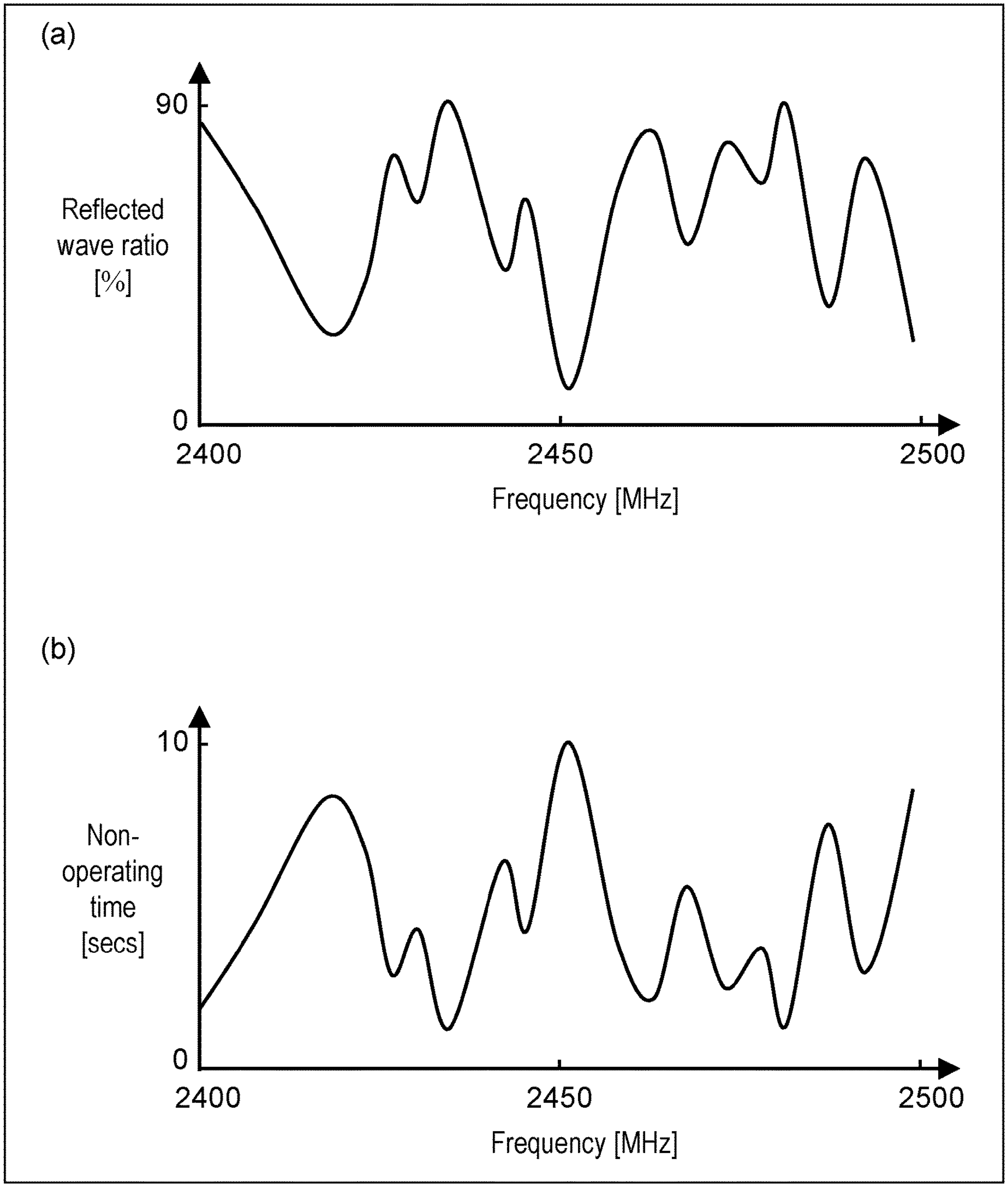
FIG. 3 includes, in (a), a diagram showing one example of the frequency characteristic of the reflected wave ratio, and includes, in (b), a diagram showing one example of non-operating time that is set for each frequency according to Example 2.

Example 2 of the present exemplary embodiment will be described. FIG. 3 shows, in (a), one example of the frequency characteristic of the reflected wave ratio. FIG. 3 shows, in (b), one example of the non-operating time that is set for each frequency of the microwave according to Example 2. As mentioned above, the reflected wave ratio is the ratio (%) of the reflected microwave power to the incident microwave power.

As shown in (a) in FIG. 3, generally, the reflected wave ratio differs depending on the frequency. A major part of the microwaves that do not return to microwave generator 3 is dissipated at heating target 2. However, a part of the microwaves is dissipated even at a component of the microwave treatment device other than heating target 2.

Examples of the component include an inner wall of heating chamber 1, components in heating chamber 1 such as door glass and a heater disposed in heating chamber 1, and a waveguide and an antenna (these correspond to feeder 5).

As the reflected wave ratio decreases, the dissipation of the microwaves at heating target 2 increases. However, the microwaves are not necessarily dissipated evenly at the entirety of heating target 2. This means that when the reflected wave ratio decreases, the heating unevenness of heating target 2 tends to increase.

Therefore, as shown in (a) in FIG. 3 and (b) in FIG. 3, in Example 2, controller 7 sets the non-operating time such that the shape of the graph in (b) in FIG. 3 and the shape of the graph in (a) in FIG. 3 are vertically opposite, in other words, the non-operating time is inversely proportional to the reflected wave ratio. According to Example 2, the heating evenness can be improved.

EXAMPLE 3

Figure 4:
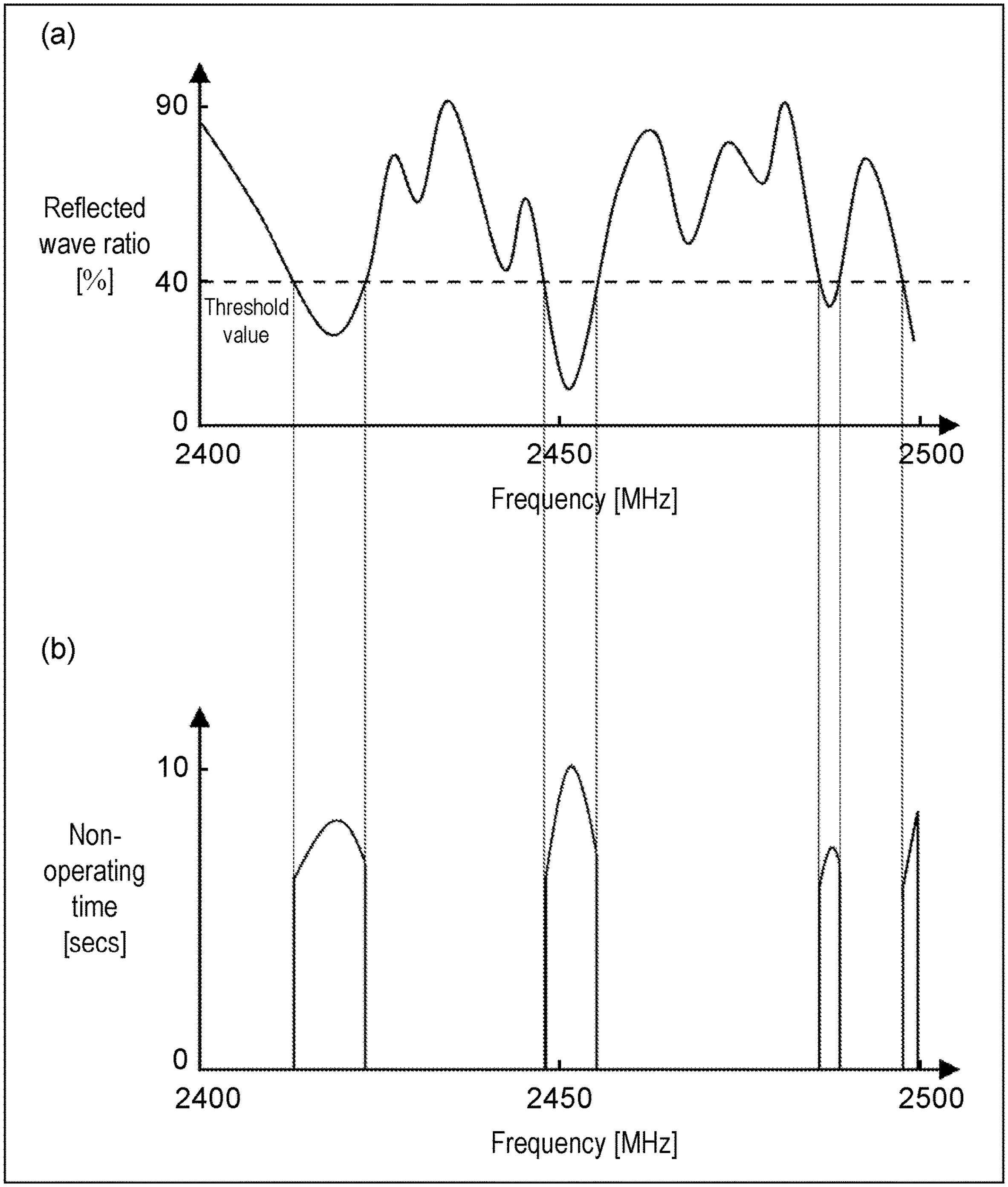
FIG. 4 includes, in (a), a diagram showing one example of the frequency characteristic of the reflected wave ratio and a threshold value that has been set, and includes, in (b), a diagram showing one example of non-operating time that is set for each frequency when the threshold value is taken into consideration.

Example 3 of the present exemplary embodiment will be described. FIG. 4 shows, in (a), one example of the frequency characteristic of the reflected wave ratio and a threshold value that has been set. FIG. 4 shows, in (b), one example of the non-operating time that is set for each frequency of the microwaves when the threshold value shown in (a) in FIG. 4 is taken into consideration.

As the reflected wave ratio increases, the dissipation of the microwaves at heating target 2 is reduced. When the dissipation of the microwaves at the entirety of heating target 2 is reduced, the temperature of heating target 2 does not even partially increase. This means that when the reflected wave ratio increases, the heating unevenness of heating target 2 tends to be reduced. Therefore, when the reflected wave ratio exceeds a specific value, it is no longer necessary to set the non-operating time.

In Example 3, controller 7 sets a threshold value (refer to (a) in FIG. 4), and at a frequency at which the reflected wave ratio is higher than the threshold value, controller 7 sets the non-operating time to zero (refer to (a) in FIG. 4 and (b) in FIG. 4). According to Example 3, the heating evenness can be improved, and cooking time can be kept from becoming longer than necessary.

A value that differs depending on the kind and the size of the heating target and the output level of the microwave needs to be set as the threshold value. An experiment shows that when the output level of the microwave is 250 W, for example, setting a value in a predetermined range (40% to 90%; in Example 3, 40%) of the reflected wave ratio as the threshold value results in improved heating evenness.

When the frequency and heating target 2 do not change, an increase in the output level of the microwave causes an increase in the heating unevenness. In order to reduce the heating unevenness, it is necessary to use only the microwave having a frequency at which the reflected wave ratio is relatively high. Therefore, controller 7 sets the threshold value of the reflected wave ratio greater in proportion to the output level.

EXAMPLE 4

Figure 5A:
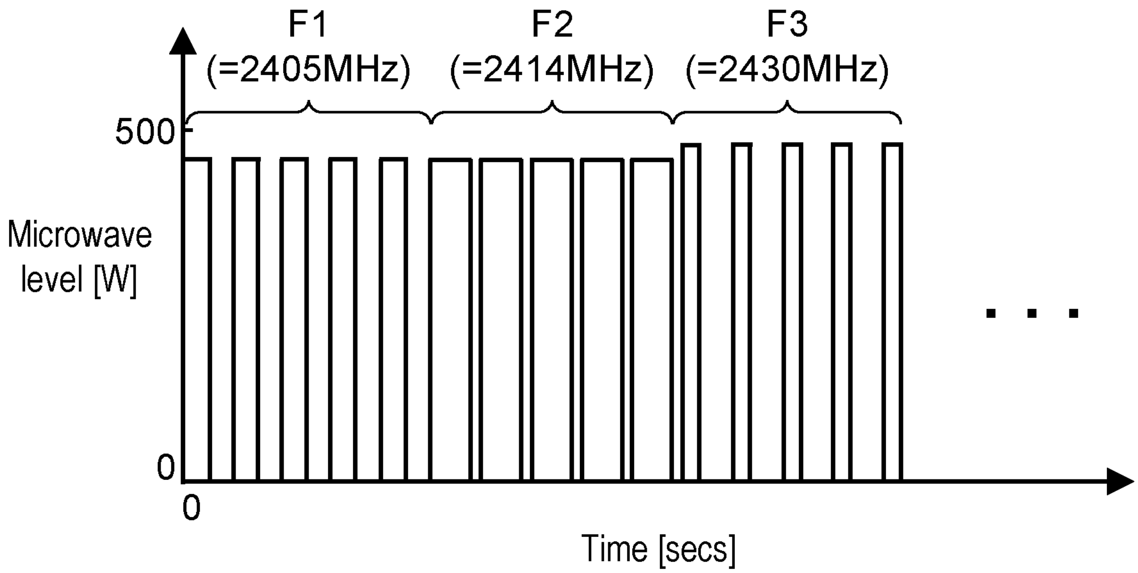
FIG. 5A is a diagram showing one example of temporal changes in a frequency, an output level, and a duty ratio according to Example 4.
Figure 5B:
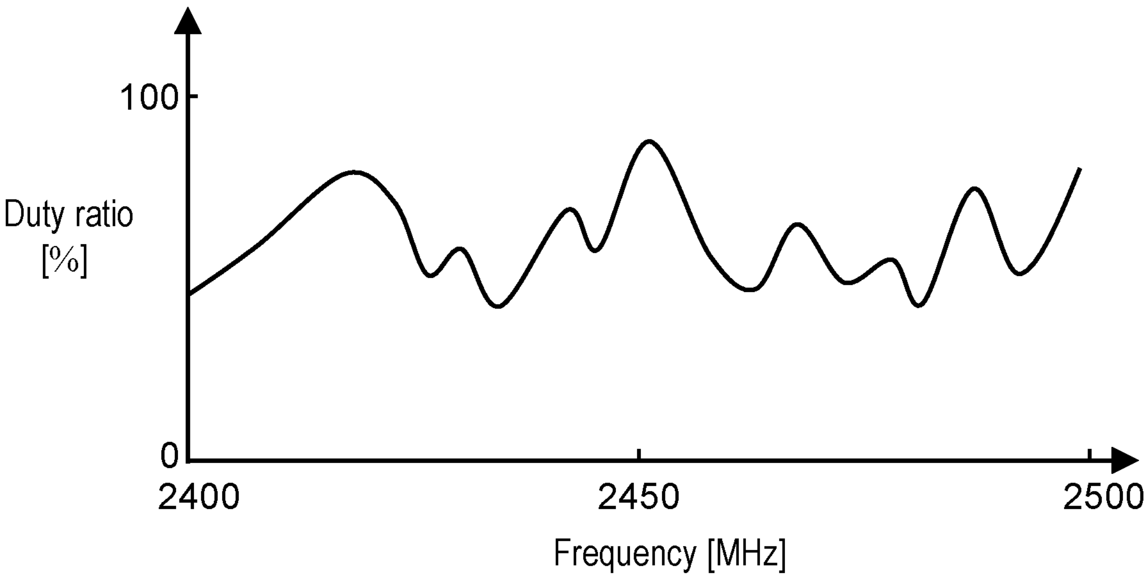
FIG. 5B is a diagram showing one example of a duty ratio that is set for each frequency according to Example 4.

Example 4 of the present exemplary embodiment will be described. FIG. 5A schematically shows one example of temporal changes in the frequency, the output level, and the duty ratio of the microwave according to Example 4. FIG. 5B shows one example of the duty ratio that is set for each frequency of the microwave according to Example 4. The duty ratio is the ratio (%) of the output time to the total of the output time and the non-operating time.

In Example 4, controller 7 performs duty control using the output time and the non-operating time that are set for each frequency in advance. The duty control is ON-OFF control in which the output of the microwave is turned ON or OFF at a predetermined or variable duty ratio.

For example, as shown in FIG. 5A, the duty ratio of the microwave having frequency F2 is set higher than the duty ratio of the microwave having frequency F1. The duty ratio of the microwave having frequency F3 is set lower than the duty ratio of the microwave having frequency F1.

Specifically, frequency F1 is 2,405 MHz, frequency F2 is 2,414 MHz, and frequency F3 is 2,430 MHz. The microwave level at frequency F2 may be set equal to that at frequency F1, and the microwave level at frequency F3 may be set higher than that at frequency F1.

With this method, heat transfers into heating target 2 and radiates from a surface of heating target 2 during the non-operating time at the time of switching the frequency. Therefore, it is possible to reduce heating unevenness caused due to the heating pattern with microwaves at the immediate previous frequency.

In this manner, it is possible to reduce variations in the permittivity of heating target 2 that have been caused due to the heating unevenness before microwaves are supplied at the next frequency. As a result, the microwaves can be kept from converging to a portion of heating target 2 that has increased permittivity, allowing for improved heating evenness.

The heating pattern and the heating unevenness change depending on the frequency. The duty ratio for reducing the heating unevenness differs at each frequency. According to Example 4, as shown in FIG. 5B, the duty ratio is changed according to the frequency, and thus the heating evenness can be improved. By keeping the duty ratio from falling more than necessary, cooking time can be kept from becoming longer than necessary.

Instead of the duty control, controller 7 may cause microwave generator 3 to alternately generate, at a predetermined time ratio, a high-level microwave and a relatively low-level microwave close to zero that have the same frequency.

EXAMPLE 5

Figure 6:
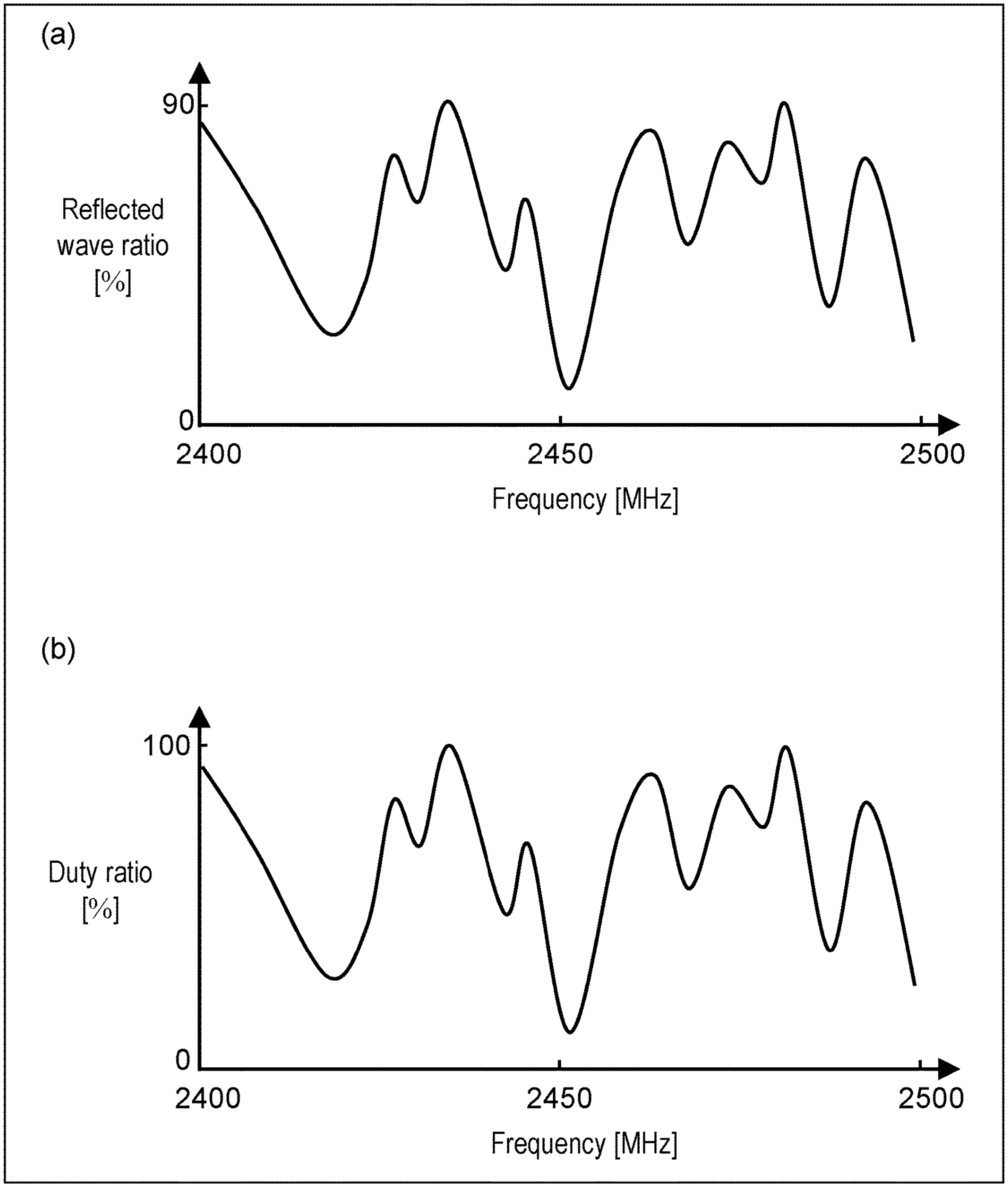
FIG. 6 includes, in (a), a diagram showing one example of the frequency characteristic of the reflected wave ratio, and includes, in (b), a diagram showing one example of a duty ratio that is set for each frequency according to Example 5.

Example 5 of the present exemplary embodiment will be described. FIG. 6 shows, in (a), one example of the frequency characteristic of the reflected wave ratio. FIG. 6 shows, in (b), one example of the duty ratio that is set for each frequency of the microwave according to Example 5.

As shown in (a) in FIG. 6, generally, the reflected wave ratio differs depending on the frequency. As the reflected wave ratio decreases, the dissipation of the microwaves at heating target 2 increases, and the heating unevenness of heating target 2 tends to increase.

In Example 5, as shown in (a) in FIG. 6 and (b) in FIG. 6, controller 7 performs the duty control such that the shape of the graph in (b) in FIG. 6 is the same as the shape of the graph in (a) in FIG. 6, in other words, the duty ratio is proportional to the reflected wave ratio. According to Example 5, the heating unevenness is reduced, and heating evenness can be improved.

EXAMPLE 6

Figure 7:
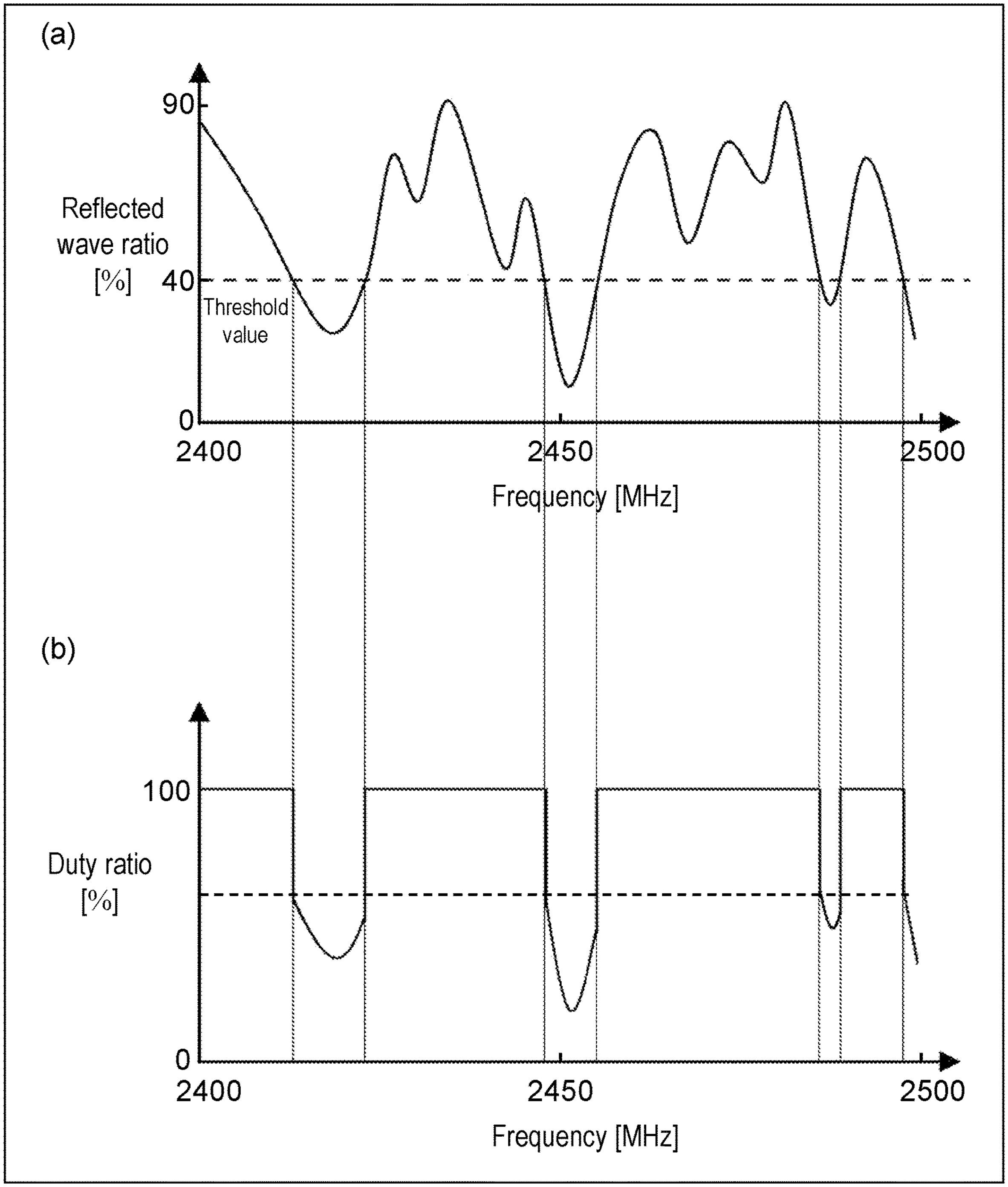
FIG. 7 includes, in (a), a diagram showing one example of the frequency characteristic of the reflected wave ratio, and includes, in (b), a diagram showing one example of a duty ratio that is set for each frequency when a threshold value is taken into consideration.

Example 6 of the present exemplary embodiment will be described. FIG. 7 shows, in (a), one example of the frequency characteristic of the reflected wave ratio and a threshold value that has been set. FIG. 7 shows, in (b), one example of the duty ratio that is set for each frequency of the microwave when the threshold value shown in (a) in FIG. 7 is taken into consideration.

As the reflected wave ratio increases, the dissipation of the microwaves at heating target 2 is reduced. When the dissipation of the microwaves at the entirety of heating target 2 is reduced, the temperature of heating target 2 does not even partially increase. This means that when the reflected wave ratio increases, the heating unevenness tends to be reduced. In Example 6, controller 7 sets the threshold value, and when the reflected wave ratio exceeds the threshold value, stops the duty control and constantly causes microwave generator 3 to continue to output the microwave.

Controller 7 sets, to 100%, the duty ratio at a frequency at which the reflected wave ratio is higher than the set threshold value (refer to (a) in FIG. 7) (refer to (a) in FIG. 7 and (b) in FIG. 7). According to Example 6, the heating evenness can be improved, and cooking time can be kept from becoming longer than necessary.

The threshold value needs to be a value that differs depending on the kind and the size of the heating target and the output level of the microwave. However, an experiment shows that when the output level of the microwave is 250 W, for example, setting a value in a predetermined range (40% to 90%; in Example 6, 40%) of the reflected wave ratio as the threshold value results in improved heating evenness.

When the frequency and heating target 2 do not change, an increase in the output level of the microwave causes an increase in the heating unevenness. In order to reduce the heating unevenness, it is necessary to use only the microwave having a frequency at which the reflected wave ratio is relatively high. Therefore, controller 7 sets the threshold value of the reflected wave ratio greater in proportion to the output level.

EXAMPLE 7

Figure 8:
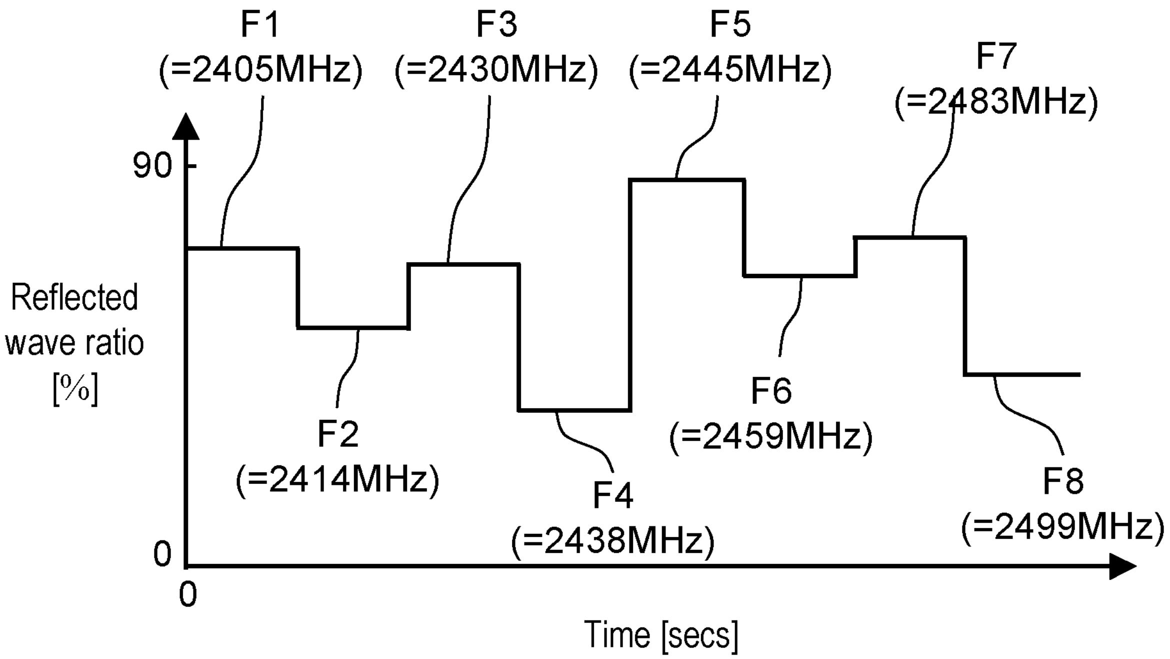
FIG. 8 is a diagram showing one example of temporal changes in a frequency and a reflected wave ratio according to Example 7.

Example 7 of the present exemplary embodiment will be described. FIG. 8 schematically shows one example of temporal changes in the frequency and the reflected wave ratio of the microwave according to Example 7.

As the reflected wave ratio decreases, the dissipation of the microwaves at heating target 2 increases, and the heating unevenness of heating target 2 tends to increase. As the reflected wave ratio increases, the dissipation of the microwaves is reduced, and the heating unevenness tends to be reduced.

As shown in FIG. 8, in Example 7, after the start of heating with the microwave having frequency F1, controller 7 causes microwave generator 3 to switch the oscillating frequency to frequency F2 so that the reflected wave ratio decreases. Subsequently, controller 7 causes microwave generator 3 to switch the oscillating frequency to frequency F3 so that reflected wave ratio increases. Controller 7 causes microwave generator 3 to perform this operation repeatedly.

In other words, the reflected wave ratio of the microwave having frequency F2 is lower than the reflected wave ratio of the microwave having frequency F1. The reflected wave ratio of the microwave having frequency F3 is higher than the reflected wave ratio of the microwave having frequency F2. The reflected wave ratio of the microwave having frequency F4 is lower than the reflected wave ratio of the microwave having frequency F3.

The reflected wave ratio of the microwave having frequency F5 is higher than the reflected wave ratio of the microwave having frequency F4. The reflected wave ratio of the microwave having frequency F6 is lower than the reflected wave ratio of the microwave having frequency F5. The reflected wave ratio of the microwave having frequency F7 is higher than the reflected wave ratio of the microwave having frequency F6. The reflected wave ratio of the microwave having frequency F8 is lower than the reflected wave ratio of the microwave having frequency F7.

Specifically, frequency F1 is 2,405 MHz, frequency F2 is 2,414 MHz, frequency F3 is 2,430 MHz, frequency F4 is 2,438 MHz, frequency F5 is 2,445 MHz, frequency F6 is 2,459 MHz, frequency F7 is 2,483 MHz, and frequency F8 is 2,499 MHz.

According to Example 7, heat transfers into heating target 2 and radiates from a surface of heating target 2 at the time of heating with the microwave having a frequency at which the reflected wave ratio is high. As a result of, it is possible to reduce the heating unevenness caused by heating with the microwave having a frequency at which the reflected wave ratio is low. This means that the heating evenness improves.

As described in Examples 1 to 3, setting the non-operating time at the time of switching the frequency results in improved heating evenness. In contrast, Example 7 is effective in terms of not only even heating, but also reduced heating time.

EXAMPLE 8

Figure 9:
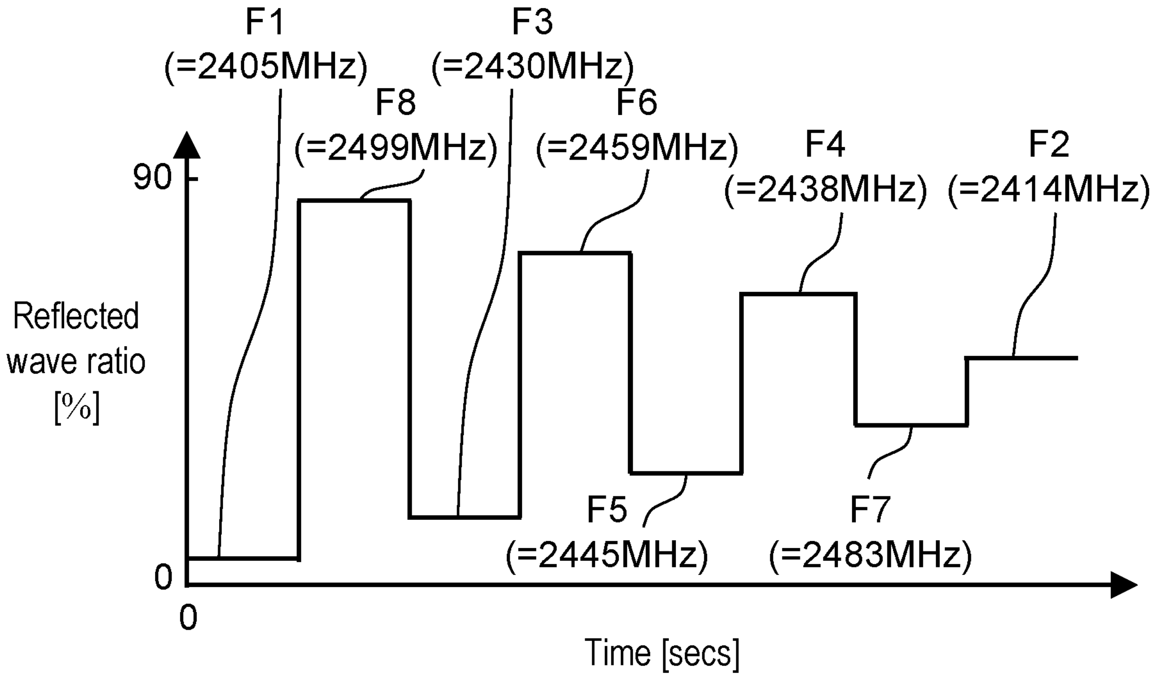
FIG. 9 is a diagram showing one example of temporal changes in a frequency and a reflected wave ratio according to Example 8.

Example 8 of the present exemplary embodiment will be described. FIG. 9 schematically shows one example of temporal changes in the frequency and the reflected wave ratio of the microwave according to Example 8.

In Example 8, as shown in FIG. 9, controller 7 causes microwave generator 3 to switch the frequency of the microwave so that the reflected wave ratio alternately increases and decreases, similar to Example 7.

In addition, regarding a frequency at which the reflected wave ratio is relatively high, controller 7 causes microwave generator 3 to generate microwaves in descending order from the highest frequency. Regarding a frequency at which the reflected wave ratio is relatively low, controller 7 causes microwave generator 3 to generate microwaves in ascending order from the lowest frequency.

Specifically, controller 7 causes microwave generator 3 to perform the following operation. Microwave generator 3 generates a microwave having frequency F1 at which the reflected wave ratio is lowest, and then generates a microwave having frequency F8 at which the reflected wave ratio is highest. Subsequently, microwave generator 3 generates a microwave having frequency F3 at which the reflected wave ratio is second lowest, and then generates a microwave having frequency F6 at which the reflected wave ratio is second highest.

Subsequently, microwave generator 3 generates a microwave having frequency F5 at which the reflected wave ratio is third lowest, and then generates a microwave having frequency F4 at which the reflected wave ratio is third highest. Subsequently, microwave generator 3 generates a microwave having frequency F7 at which the reflected wave ratio is fourth lowest, and then generates a microwave having frequency F2 at which the reflected wave ratio is fourth highest.

Specifically, frequency F1 is 2,405 MHz, frequency F2 is 2,414 MHz, frequency F3 is 2,430 MHz, frequency F4 is 2,438 MHz, frequency F5 is 2,445 MHz, frequency F6 is 2,459 MHz, frequency F7 is 2,483 MHz, and frequency F8 is 2,499 MHz.

According to Example 8, the heating evenness can be improved while the control is simplified. The simplification of the control means reducing the number of parameters required to determine, for example, the output level and the oscillation time of the microwave at each frequency and the order of frequencies to be generated.

In this method, significantly uneven heating and slightly uneven heating are alternately carried out in the order of heating levels. Thus, for example, when microwaves having the same output level at every frequency are used, the heating time at each frequency is equal. As a result, the control can be more simplified.

EXAMPLE 9

Figure 10:
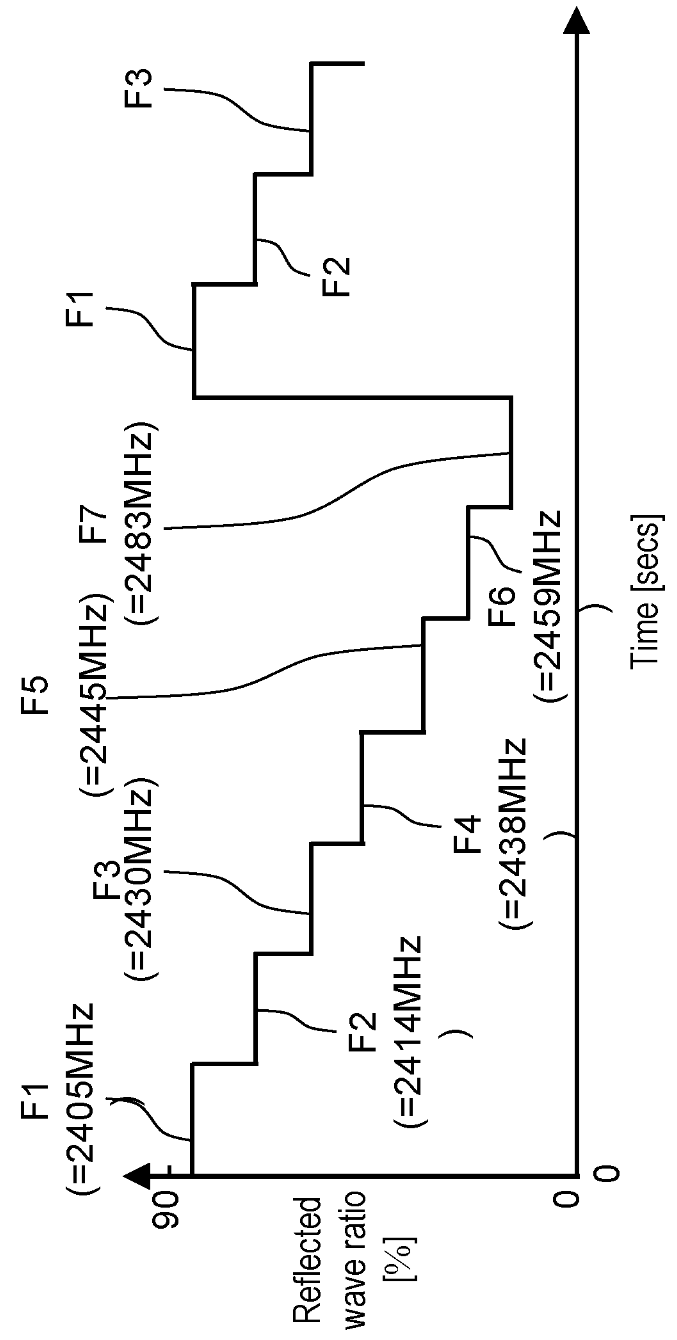
FIG. 10 is a diagram showing one example of temporal changes in a frequency and a reflected wave ratio according to Example 9.

Example 9 of the present exemplary embodiment will be described. FIG. 10 schematically shows one example of temporal changes in the frequency and the reflected wave ratio of the microwave according to Example 9. As shown in FIG. 10, controller 7 causes microwave generator 3 to generate microwaves having frequencies in ascending order of reflected wave ratios.

In Example 9, the reflected wave ratios of the microwaves having frequency F1 to frequency F7 are higher in this order, leading to less heating unevenness. Specifically, the reflected wave ratios at frequency F1 to frequency F4 are higher than those at frequency F5 to frequency F7. At the time of heating with the microwave having a frequency at which the heating unevenness is relatively low, heat transfers into heating target 2 and radiates from a surface of heating target 2.

Specifically, frequency F1 is 2,405 MHz, frequency F2 is 2,414 MHz, frequency F3 is 2,430 MHz, frequency F4 is 2,438 MHz, frequency F5 is 2,445 MHz, frequency F6 is 2,459 MHz, and frequency F7 is 2,483 MHz.

As a result, the heating unevenness caused by heating with the microwave having a frequency at which the reflected wave ratio is low is reduced at the time of heating with the microwave having a frequency at which the reflected wave ratio is high. This means that the heating evenness improves.

In Example 9, the heating time per frequency is set shorter than that applied in the control method in which the non-operating time is set at the time of switching the frequency as described in Examples 1 to 3. With this, the heating evenness tends to improve.

This is because as the heating time per frequency increases, the heating unevenness increases in the heating with the microwave having a frequency at which the reflected wave ratio is relatively low, and proteins are locally denatured.

EXAMPLE 10

Figure 11:
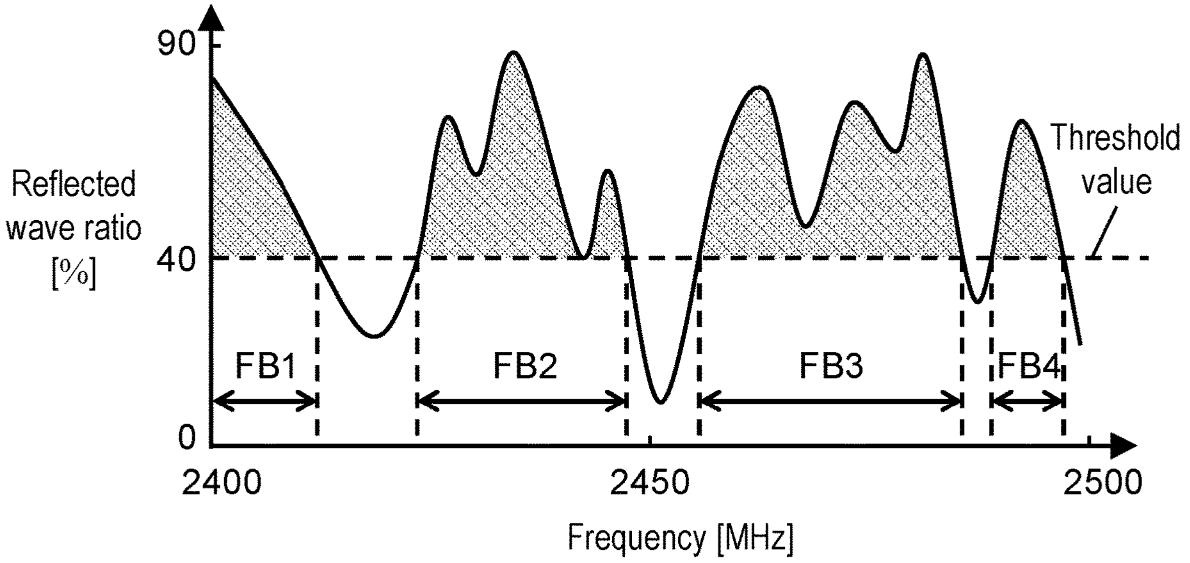
FIG. 11 is a diagram showing one example of the frequency characteristic of the reflected wave ratio and a threshold value that has been set.

Example 10 of the present exemplary embodiment will be described. FIG. 11 shows one example of the frequency characteristic of the reflected wave ratio and a threshold value that has been set.

As shown in FIG. 11, in Example 10, controller 7 uses only the microwave having a frequency in a frequency band (frequency bands FB1, FB2, FB3, FB4) in which the reflected wave ratio is higher than a predetermined threshold value. This aims to use only the microwave having a frequency at which the heating unevenness is relatively low. Therefore, when this control is performed for a longer period of time, the heating evenness improves for that.

A value that differs depending on the kind and the size of the heating target and the output level of the microwave needs to be set as the threshold value. However, an experiment shows that when the output level of the microwave is 250 W, for example, setting a value in a predetermined range (40% to 90%; in Example 10, 40%) of the reflected wave ratio as the threshold value results in improved heating evenness.

When the frequency and heating target 2 do not change, an increase in the output level of the microwave causes an increase in the heating unevenness. In order to reduce the heating unevenness, it is necessary to use only the microwave having a frequency at which the reflected wave ratio is relatively high. Therefore, controller 7 sets the threshold value of the reflected wave ratio greater in proportion to the output level.

During the period between the start and the end of the operation of microwave generator 3, that is, the period between the start and the end of heating, controller 7 uses only the microwave having a frequency at which the reflected wave ratio is higher than the threshold value. With this, the heating evenness further improves.

When this control is performed at least any time in the first half of heating by using only the microwave having a frequency at which the reflected wave ratio is higher than the threshold value during the period between the start and the end of heating, the heating evenness improves.

This is because the heating unevenness can be reduced in the initial stage of heating which has a significant impact on the heating unevenness at the end of heating. If the heating unevenness is high in the initial stage of heating, the microwaves converge locally to a portion of heating target 2 that has high permittivity for a long period until the end of heating.

EXAMPLE 11

Figure 12:
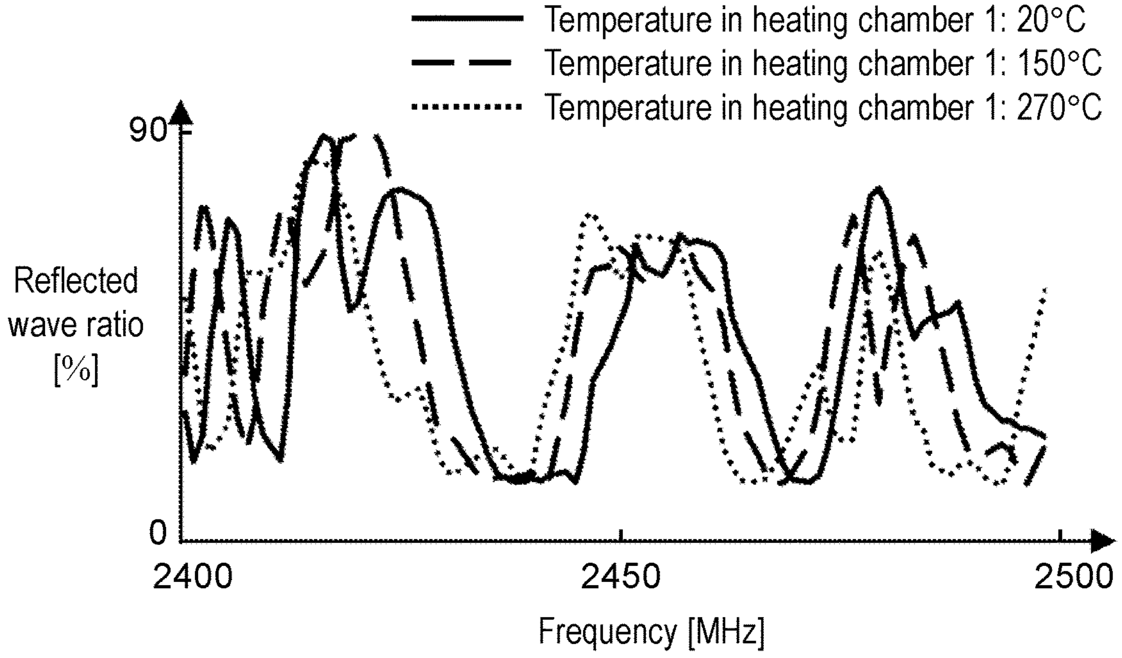
FIG. 12 is a diagram showing one example of the frequency characteristics of reflected wave ratios at different temperatures within a heating chamber.

Example 11 of the present exemplary embodiment will be described. FIG. 12 shows one example of the frequency characteristics of the reflected wave ratios at different temperatures within heating chamber 1.

As shown in FIG. 12, the frequency characteristic of the reflected wave ratio changes depending on the temperature in heating chamber 1. Specifically, as the temperature in heating chamber 1 increases, the frequency characteristic of the reflected wave ratio shifts to the left where the frequency is relatively low while the waveform of the frequency characteristic of the reflected wave ratio remains substantially the same.

This is due to the resonance frequency of the microwave in heating chamber 1 being reduced as the temperature within heating chamber 1 increases. One reason for this phenomenon is that a metal in a wall surface of heating chamber 1 expands and the internal volume of heating chamber 1 slightly increases. The other reason is that due to an increase in the permittivity of door glass, the compression ratio of the wavelength of the microwave increases within the door glass.

Such a situation occurs in oven hating that uses convection heating and radiation heating besides microwaves, for example.

Therefore, controller 7 executes the frequency sweep on the basis of the temperature in heating chamber 1, and obtains the frequency characteristic of the reflected wave ratio again. Controller 7 resets the oscillation conditions for the microwave on the basis of the frequency characteristic of the reflected wave ratio.

The oscillation conditions represent the frequency and the output level of the microwave. Controller 7 causes microwave generator 3 to change the frequency of the microwave, causes amplifier 4 to change the output level of the microwave, and resets the oscillation conditions. Thus, the heating evenness can be improved.

Regarding the three graphs shown in FIG. 12, the rates of increase in the temperature within heating chamber 1 are substantially the same, and the frequency characteristics of the reflected wave ratios shift to the left by substantially the same frequencies according to said increase in the temperature. Therefore, each time the temperature in heating chamber 1 changes by a predetermined value, controller 7 executes the frequency sweep, obtains the frequency characteristic of the reflected wave ratio again, and resets the oscillation conditions for the microwave. Thus, the heating evenness can be improved.

The extent of changes in the temperature in heating chamber 1, which indicates the preferred timing of obtaining the frequency characteristic of the reflected wave ratio again, depends on the shape of heating chamber 1, the material of a wall surface of heating chamber 1, and the kind and the size of heating target 2, for example. The frequency characteristics shown in FIG. 12 are measured under the following three conditions: (1) the volume of heating chamber 1 is 50 liters; (2) the wall surface is an enameled steel plate; and (3) no heating target 2 is placed in heating chamber 1.

In the case of the frequency characteristics shown in FIG. 12, the frequency characteristic of the reflected wave ratio needs to be obtained again at intervals of 100° C. at a maximum, preferably at intervals of 20° C., in consideration of the extent of the shift.

Each time the temperature within heating chamber 1 exceeds or falls below a predetermined temperature, controller 7 may obtain the frequency characteristic of the reflected wave ratio again and reset the oscillation conditions for the microwave. Put differently, the time when the temperature within heating chamber 1 exceeds or falls below the predetermined temperature is the time when the temperature within heating chamber 1 passes the predetermined temperature.

When the condition indicating the timing of resetting is clearly defined, it is possible to reduce the impact of a change in the resonance frequency within heating chamber 1 that is due to a change in the temperature within heating chamber 1. As a result, heating can be stably carried out more evenly.

The temperature in heating chamber 1 at which the frequency characteristic of the reflected wave ratio needs to be obtained again is desirably set to be half the value of the set temperature for oven hating that uses convection heating and radiation heating. This temperature may be half the value of the difference between the set temperature and a room temperature.

In Examples 1 to 11, controller 7 may use the dissipation factor of microwaves in heating chamber 1 instead of the reflected wave ratio. The dissipation factor of microwaves in heating chamber 1 is the ratio (%) of the difference between the incident microwave power and the reflected microwave power to the incident microwave power.

Controller 7 may estimate dissipation of microwaves on an inner wall of heating chamber 1, at components in heating chamber 1 such as a heater and door glass, and in a transmission path, for example, and modify the reflected wave ratio on the basis of the numerical value of the estimated dissipation.

Controller 7 may estimate dissipation of microwaves at heating target 2 on the basis of the temperature of heating target 2 obtained using an infrared sensor or the like, and use the numerical value of the estimated dissipation instead of the reflected wave ratio.

INDUSTRIAL APPLICABILITY

A microwave treatment device according to the present disclosure can also be applied to drying devices, heating devices for ceramic art, garbage disposers, semiconductor manufacturing devices, chemical reaction devices, and the like, in addition to cooking appliances described above.

REFERENCE MARKS IN THE DRAWINGS

1 heating chamber
2 heating target
3 microwave generator
4 amplifier
5 feeder
6 detector
7 controller
8 storage

What is claimed is:

1. A microwave treatment device comprising:

a heating chamber configured to accommodate a heating target;

a microwave generator operable to generate a microwave having an arbitrary frequency in a predetermined frequency band;

an amplifier operable to amplify the microwave and output, as incident microwave power, the microwave amplified;

a feeder configured to supply the incident microwave power to the heating chamber;

a detector operable to detect the incident microwave power and reflected microwave power that returns from the heating chamber to the feeder;

a controller operable to control the microwave generator and the amplifier; and a storage operable to store the incident microwave power and the reflected microwave power together with the frequency of the microwave and time elapsed since a start of heating, wherein the controller is operable to cause the microwave generator to execute a frequency sweep over the predetermined frequency band and is operable to control the microwave generator and the amplifier based on the incident microwave power and the reflected microwave power detected during the frequency sweep, wherein the controller is operable to, in changing the frequency of the microwave, set a non-operating time during which the microwave is not output, and change the non-operating time according to the frequency of the microwave, the non-operating time for each frequency being fixed in dependence with the reflected microwave power at each frequency.

2. The microwave treatment device according to claim 1, wherein the controller is operable to calculate a reflected wave ratio and set the non-operating time longer as the reflected wave ratio decreases, the reflected wave ratio being a ratio of the reflected microwave power to the incident microwave power at each frequency applied in the frequency sweep.

3. The microwave treatment device according to claim 1, wherein the controller is operable to calculate a reflected wave ratio and avoid setting the non-operating time for the microwave having the frequency at which the reflected wave ratio exceeds a predetermined value, the reflected wave ratio being a ratio of the reflected microwave power to the incident microwave power at each frequency applied in the frequency sweep.

4. The microwave treatment device according to claim 1, wherein the controller is operable to change a duty ratio in output of the microwave according to the frequency.

5. The microwave treatment device according to claim 4, wherein the controller is operable to calculate a reflected wave ratio and set the duty ratio higher as the reflected wave ratio increases, the reflected wave ratio being a ratio of the reflected microwave power to the incident microwave power at each frequency applied in the frequency sweep.

6. The microwave treatment device according to claim 4, wherein the controller is operable to calculate a reflected wave ratio and set, to 100 percent, the duty ratio of the microwave having the frequency at which the reflected wave ratio exceeds a predetermined value, the reflected wave ratio being a ratio of the reflected microwave power to the incident microwave power at each frequency applied in the frequency sweep.

7. The microwave treatment device according to claim 1, wherein the controller is operable to cause the microwave generator to alternately generate, at a predetermined time ratio, the microwave having a frequency at which a reflected wave ratio is relatively high and the microwave having a frequency at which the reflected wave ratio is relatively low, the reflected wave ratio being a ratio of the reflected microwave power to the incident microwave power.

8. The microwave treatment device according to claim 7, wherein the controller is operable to cause the microwave generator to generate the microwave in descending order of the frequency when the reflected wave ratio at the frequency is relatively high, and generate the microwave in ascending order of the frequency when the reflected wave ratio at the frequency is relatively low.

9. The microwave treatment device according to claim 1, wherein the controller is operable to calculate a reflected wave ratio and cause the microwave generator to generate the microwave in descending order of the reflected wave ratio starting from the microwave having the frequency at which the reflected wave ratio is highest, the reflected wave ratio being a ratio of the reflected microwave power to the incident microwave power at each frequency applied in the frequency sweep.

10. The microwave treatment device according to claim 1, wherein the controller is operable to calculate a reflected wave ratio and cause the microwave generator to generate only the microwave having the frequency at which the reflected wave ratio exceeds a predetermined value, the reflected wave ratio being a ratio of the reflected microwave power to the incident microwave power at each frequency applied in the frequency sweep.

11. The microwave treatment device according to claim 10, wherein the controller is operable to cause the microwave generator to generate, during a period between the start and an end of the heating, only the microwave having the frequency at which the reflected wave ratio exceeds the predetermined value.

12. The microwave treatment device according to claim 10, wherein the controller is operable to calculate the reflected wave ratio until a first half of the period between the start and an end of the heating elapses.

13. The microwave treatment device according to claim 1, wherein the controller is operable to, based on a temperature in the heating chamber, cause the microwave generator to execute the frequency sweep, and reset the frequency and an output level of the microwave which are oscillation conditions for the microwave.

14. The microwave treatment device according to claim 13, wherein the controller is operable to, each time the temperature in the heating chamber changes by a predetermined value, cause the microwave generator to execute the frequency sweep, and reset the oscillation conditions for the microwave.

15. The microwave treatment device according to claim 13, wherein the controller is operable to, each time the temperature in the heating chamber passes a predetermined temperature, cause the microwave generator to execute the frequency sweep, and reset the oscillation conditions for the microwave.

* * * * *